United States Patent
Kii et al.

[11] Patent Number: 5,871,682
[45] Date of Patent: Feb. 16, 1999

[54] WEATHER STRIP AND A CORE BREAKING MACHINE FOR PARTIALLY BREAKING THE CORE OF WEATHER STRIP

[75] Inventors: Asajiro Kii; Masanori Shoji, both of Hiroshima, Japan

[73] Assignee: Nishikawa Rubber Co., Ltd., Hiroshima, Japan

[21] Appl. No.: 878,317

[22] Filed: Jun. 18, 1997

Related U.S. Application Data

[63] Continuation of Ser. No. 556,742, Nov. 7, 1995, abandoned.

[30] Foreign Application Priority Data

Nov. 16, 1994 [JP] Japan .................................. 6-308194
Mar. 24, 1995 [JP] Japan .................................. 7-91534

[51] Int. Cl.$^6$ .................................................. B32B 31/16
[52] U.S. Cl. ........................... 264/285; 428/122; 428/43; 49/490.1
[58] Field of Search .................... 428/122, 43; 49/490.1; 264/285

[56] References Cited

U.S. PATENT DOCUMENTS

| | | | |
|---|---|---|---|
| 3,527,013 | 9/1970 | Kruschwitz | 428/122 |
| 4,343,845 | 8/1982 | Burden et al. | 428/122 |
| 5,143,666 | 9/1992 | McManus et al. | 428/122 |
| 5,204,157 | 4/1993 | Matsumiya | 428/122 |

FOREIGN PATENT DOCUMENTS

53-75627  7/1978  Japan .

*Primary Examiner*—Alexander Thomas
*Attorney, Agent, or Firm*—Flynn, Thiel, Boutell & Tanis, P.C.

[57] ABSTRACT

A weather strip is formed in an integral structure comprising: a welt part to be put on a flange formed on the edge of an opening in the body of an automobile, a sealing part protruding from the outer side wall of the welt part; and a core formed by punching a plate and buried in the welt part. The weather strip has a breakout section in which the core is broken apart at plurality of positions so that the breakout section is stretchable and contractible. A core breaking machine comprises: shafts arranged in a row and supported for turning; bending members on which the breakout section of the welt part of the weather strip is put on, fixedly joined to the upper ends of the shafts, respectively; gears fixedly mounted on the lower ends of the shafts, respectively, so that the adjacent gears are engaged; and a driving mechanism for driving the gears for turning alternately in opposite directions to turn the bending members alternately in opposite directions through a predetermined angle, respectively. The core breaking machine bends the breakout section of the weather strip repeatedly and alternately in opposite directions to cause portions of the core in the breakout section of the weather strip are broken apart due to fatigue.

6 Claims, 8 Drawing Sheets

WEATHER STRIP AND A CORE BREAKING MACHINE FOR PARTIALLY BREAKING THE CORE OF WEATHER STRIP

This is a continuation of Ser. No. 08/556 742, filed Nov. 7, 1995 now abandoned.

BACKGROUND OF THE INVENTION

1. Field of the Invention

The present invention relates to a weather strip with built-in core to be attached to a flange formed on a frame defining an opening in the body of an automobile, a method of partially breaking the core of a weather strip, and a core breaking machine for partially breaking the core of a weather strip.

2. Description of the Related Art

Conventional cores to be buried in weather strips to be put on a flange formed on a frame defining an opening in the body of an automobile are classified into the following types:

a) Cores of a wire carrier type formed by bending a wire in the shape of a hairpin;
   b) Cores of a breakout type formed by arranging U-shaped loops at intervals in the shape of a channel;
   c) Cores of a rhombus type formed by punching a strip in a shape having a successive arrangement of rhombuses;
   d) Cores of a lath type formed by punching holes in a strip; and
   e) Cores of fish-bone type formed by punching and bending a strip in a fish-bone shape.

A weather strip provided with the core of a breakout type is bendable, stretchable and contractible when putting the weather strip on the flange because the U-shaped loops are separate from each other and, therefore, the weather strip can be easily put on the flange. On the other hand, a weather strip provided with a core of a type other than the breakout type is bendable but neither stretchable nor contractible and, therefore, it is difficult to put the weather strip on the flange. However, the weather strip provided with a core of a breakout type is inferior in capability of holding to the flange and the weather strip is liable to fall off the flange.

Figure 1:
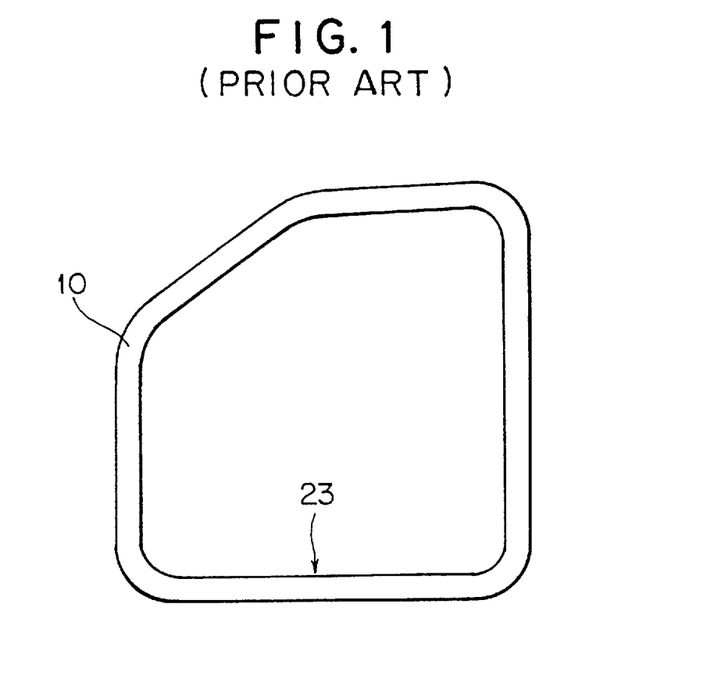
FIG. 1 is a side view of a conventional weather strip integrally provided with a core.
Figure 2:
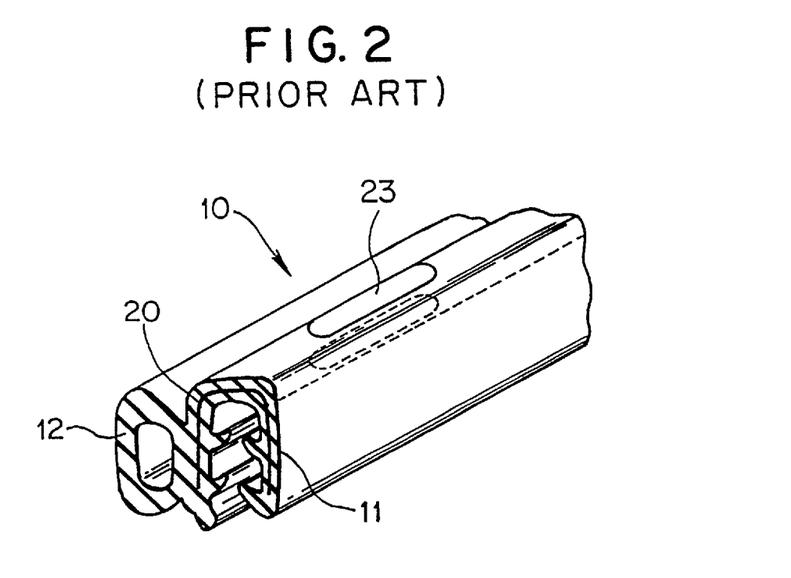
FIG. 2 is a perspective view of the weather strip of FIG. 1.
Figure 3:
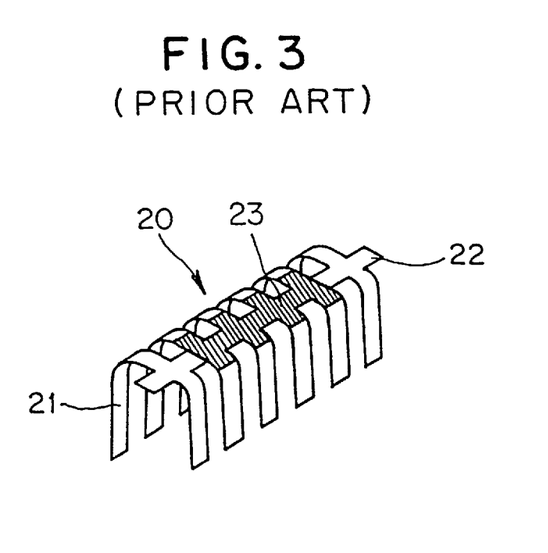
FIG. 3 is a perspective view of a core buried in the weather strip of FIG. 2.
Figure 4:
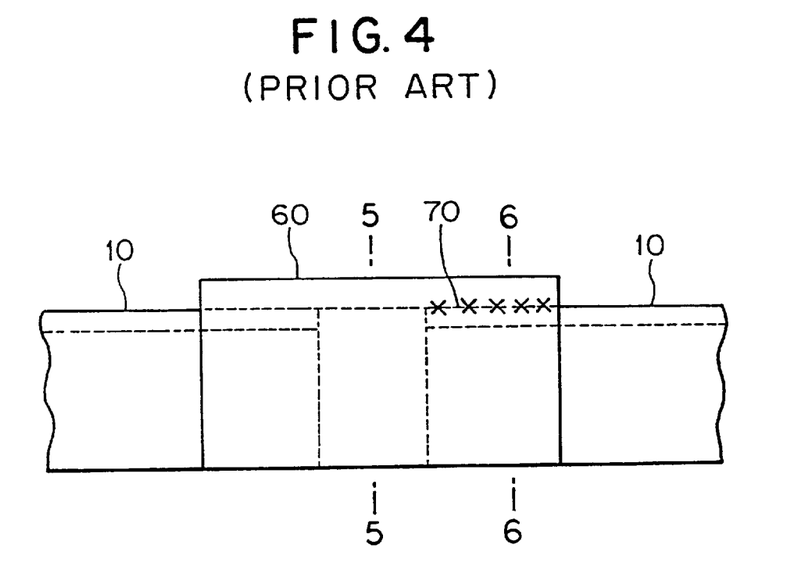
FIG. 4 is a fragmentary front view of another conventional weather strip integrally provided with a core.
Figure 5:
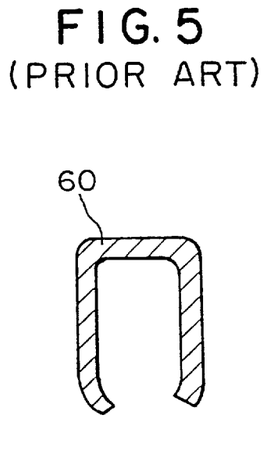
FIG. 5 is a sectional view taken on the line A—A in FIG. 4.
Figure 6:
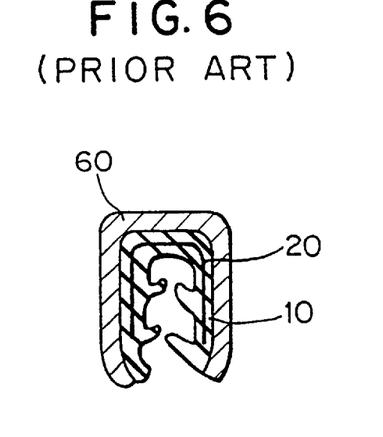
FIG. 6 is a sectional view taken on the line B—B in FIG. 4.

Referring to FIGS. 1 to 4, a method of putting a weather strip 10 integrally provided with a core 20 of, for example, a fish-bone type formed by successively connecting U-shaped loops 21 by a longitudinal connecting part 22 as shown in FIG. 3 on a flange formed in a frame defining an opening in the body of an automobile, punches out a portion 23 of the connecting part 22 to enable the weather strip 10 to be stretched or contracted so that the length of the weather strip 10 coincides with that of the flange. Another method of putting the weather strip 10 on the flange forms the weather strip 10 in a length shorter than that of the flange, puts the weather strip 10 on the flange so that the opposite ends of the weather strip 10 are spaced apart, and an end cap 60 is put on and attached with an adhesive 70 to the opposite ends of the weather strip 10 as shown in FIG. 4. These methods require troublesome work.

The weather strip integrally provided with a core of a breakout type is formed by extruding rubber or synthetic resin in the shape of the weather strip together with a core, and bending the weather strip by a bender to break apart the U-shaped loops of the core so that the weather strip is stretchable and contractible to facilitate the work for putting the weather strip on the flange. However, this weather strip is liable to slip out of position and to fall off the flange due to thermal contraction or the like.

SUMMARY OF THE INVENTION

Accordingly, it is an object of the present invention to provide a stretchable and contractible weather strip integrally provided with a partially broken core, capable of being easily and firmly put on a flange formed on a frame defining an opening in the body of an automobile.

Another object of the present invention is to provide a method of partially breaking the core of a weather strip to make the weather strip stretchable and contractible.

A further object of the present invention is to provide a core breaking machine for partially breaking the core of a weather strip to make the weather strip stretchable and contractible.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Figure 7:
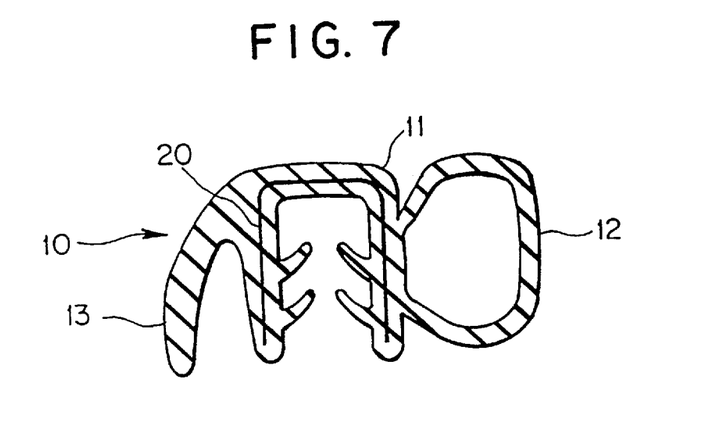
FIG. 7 is a sectional view of a weather strip integrally provided with a core, in a preferred embodiment according to the present invention.
Figure 8:
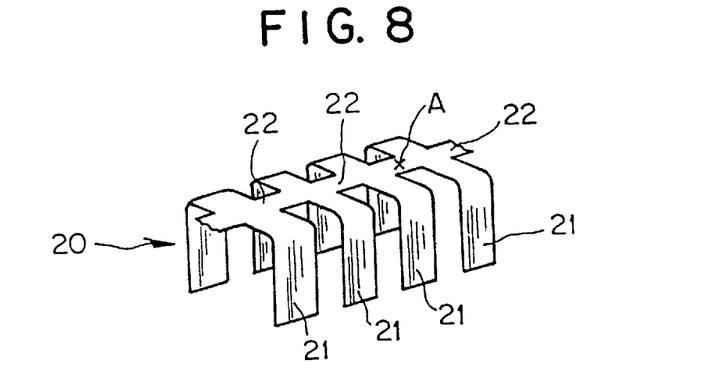
FIG. 8 is a fragmentary perspective view of the core of the weather strip of FIG. 7.
Figure 9:
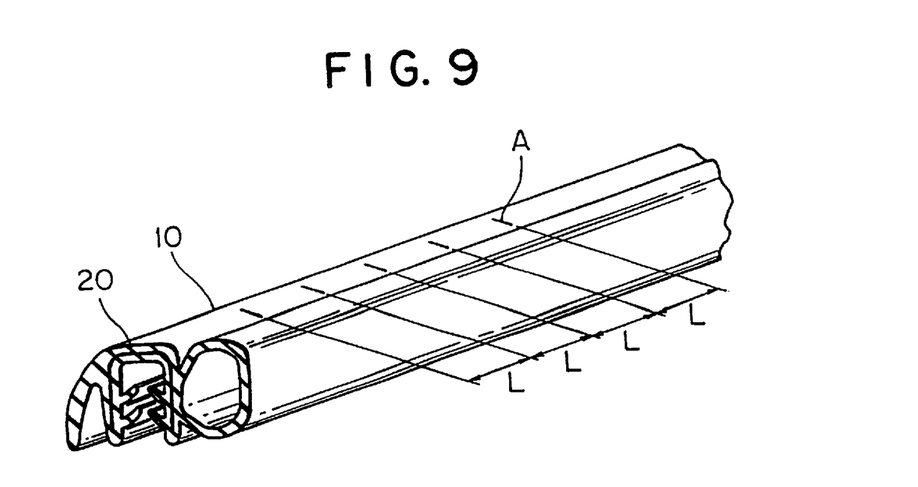
FIG. 9 is a fragmentary perspective view of the weather strip of FIG. 7, of assistance in explaining positions where the core of the weather strip is broken apart.

Referring to FIGS. 7 and 8, a weather strip 10 in a preferred embodiment according to the present invention is an integral structure having a welt part 11 of a substantially U-shaped cross section to be put on a flange formed on the body of a car, a hollow sealing part 12 protruding from the outer side wall of the welt part 11, a lip 13 projecting from the inner side wall of the welt part 11, and a core 20 (a fish-bone core in this embodiment) having a plurality of U-shaped loops 21 and a linear connecting part 22 successively connecting the U-shaped loops 21, and buried in the welt part 11 with the connecting part 22 extended in the upper wall of the welt part 11.

Figure 10:
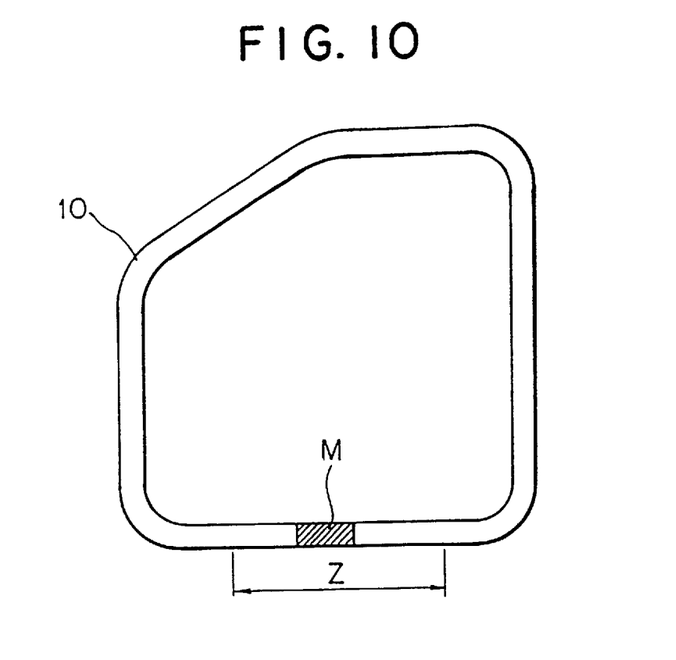
FIG. 10 is a side view of the weather strip of FIG. 7, of assistance in explaining a section of the weather strip in which the core is broken apart.
Figure 11:
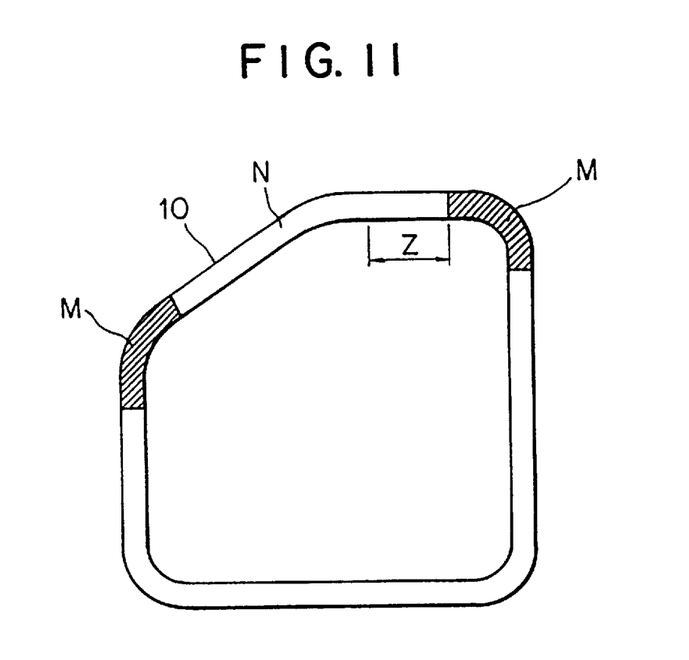
FIG. 11 is a side view of the weather strip of FIG. 7, of assistance in explaining a section of the weather strip in which the core is broken apart.

As shown in FIGS. 8, 9, 10 and 11, the connecting part 22 of the core 20 is cut at positions A spaced apart at intervals L in a breakout section Z so that the breakout section Z of the weather strip is stretchable and contractible. When the weather strip 10 is put on the flange around the edge of the opening, the breakout section Z is formed in a portion of the weather strip 10 corresponding to the lower edge of the opening as shown in FIG. 10. When the weather strip 10 of extrusion is put on the flange in a section N of the edge of the opening and the opposite ends of the weather strip 10 are joined to molded connecting members M, respectively, as shown in FIG. 11, the breakout section Z is formed in one end portion of the weather strip 10 as shown in FIG. 11.

Figure 12:
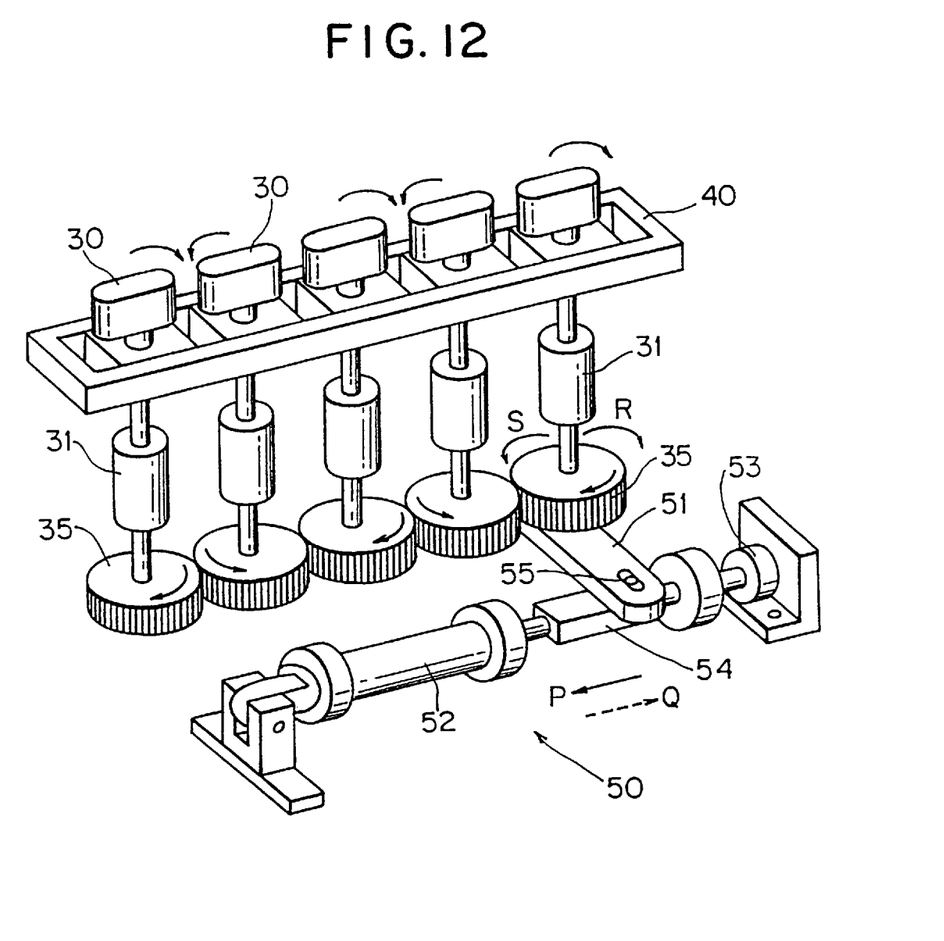
FIG. 12 is a typical perspective view of a core breaking machine in a preferred embodiment according to the present invention.

FIG. 12 shows a core breaking machine embodying the present invention for braking the connecting part 22 of the core 20 at positions A spaced apart at the intervals L (FIG. 9) in the breakout section Z (FIG. 10 or 11). The core breaking machine comprises shafts 31 arranged in a row and supported for turning in bearings on a support frame 40, bending members 30 of a fixed length L (30 to 35 mm) on which the breakout section Z of the weather strip 10 is put on, fixedly joined to the upper ends of the shafts 31, respectively, gears 35 fixedly mounted on the lower ends of the shafts 31, respectively, so that the adjacent gears 35 are engaged, and a driving mechanism 50 for driving the gears 35 for turning alternately in opposite directions indicated by the arrows S and R to turn the bending members 30 for turning alternately in opposite directions in the directions of the arrows through a predetermined angle, respectively. The driving mechanism 50 comprises a driving cylinder actuator 52, a stopper cylinder actuator 53, a link 54 having one end connected to the extremity of the actuating rod of the driving cylinder actuator 52 and the other end connected to the extremity of the actuating rod of the stopper cylinder actuator 53, and an arm 51 having one end fixed to one of the gears 35 and the other end joined to a pin 55 attached to the link 54.

Figure 13:
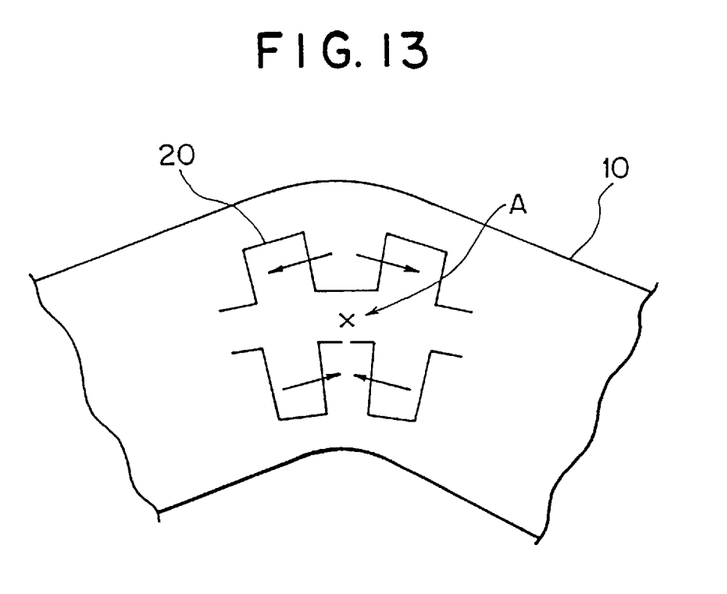
FIG. 13 is a diagrammatic view of assistance in explaining the core breaking principle of the core breaking machine of FIG. 10.
Figure 14:
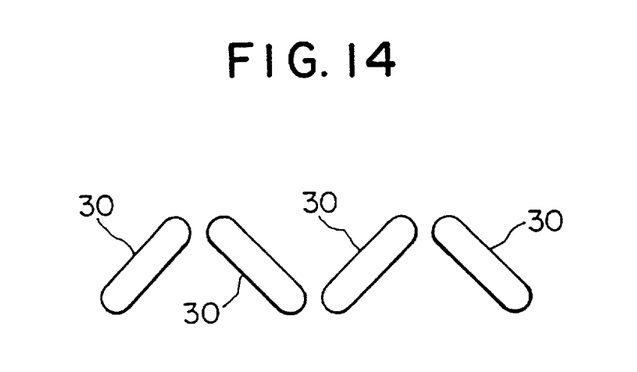
FIG. 14 is a plan view of assistance in explaining the action of the core bending members of the core breaking machine of FIG. 10.
Figure 15:
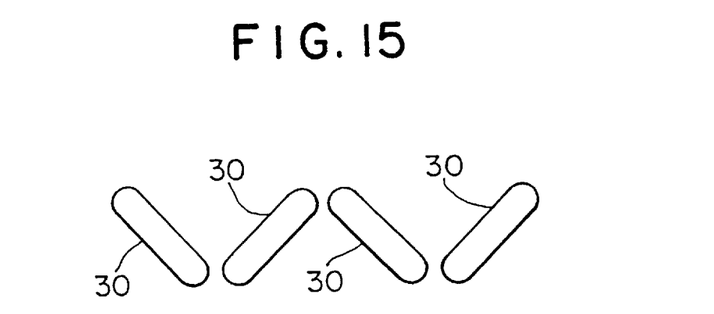
FIG. 15 is a plan view of assistance in explaining the action of the core bending members of the core breaking machine of FIG. 10.
Figure 16:
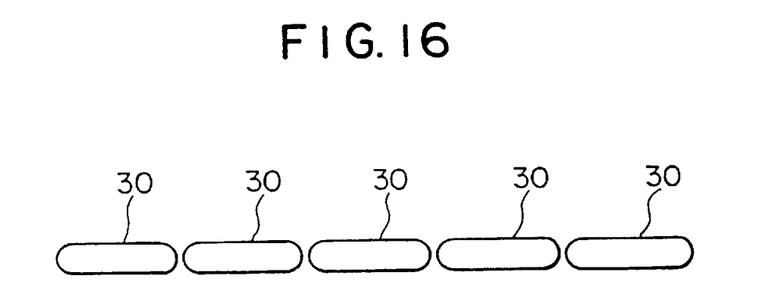
FIG. 16 is a plan view of assistance in explaining the action of the core bending members of the core breaking machine of FIG. 10.

When partly breaking the core 20 of the weather strip 10 at positions in the breakout section Z, the bending members 30 are aligned as shown in FIG. 16, a portion of the welt part 11 in the breakout section Z of the weather strip 10 is put on the bending members 30, and then the driving mechanism 50 is actuated to project and retract the actuating rod of the driving cylinder actuator 52 alternately. When the actuating rod of the driving cylinder actuator 52 is moved a predetermined distance in the direction of the arrow P, the gear 35 interlocked with the driving mechanism 50 turns through a predetermined angle in the direction of the arrow R and the adjacent gears 35 turn in opposite directions as indicated by the arrows in FIG. 12. Consequently, the bending members 30 are turned to positions shown in FIG. 14 to bend the weather strip 10 in a zigzag shape, so that the core 20 is bent as shown in FIG. 13. Then the actuating rod of the driving cylinder 52 is moved a predetermined distance in the direction of the arrow P. Consequently, the gear 35 interlocked with the driving mechanism 50 turns through a predetermined angle in the direction of the arrow S and the adjacent gears 35 turn in opposite directions opposite the directions indicated by the arrows in FIG. 12, and the bending members 30 are turned to positions shown in FIG. 15 to bend the weather strip 10 in opposite directions in a zigzag shape, so that the core 20 is bent in a direction opposite the direction shown in FIG. 13.

As the weather strip 10 is thus bent in the zigzag shapes repeatedly, the connecting part 22 of the core 20 breaks at positions A (FIG. 13) due to fatigue. After the bending of the weather strip 10 has been repeated a predetermined number of times, the driving mechanism 50 is stopped so that the bending members 30 are stopped at positions shown in FIG. 16, and the weather strip 10 is removed from the core breaking machine.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A method of preparing an elongate length of weather strip prior to installation about the edge of an opening in a body of an automobile, the weather strip having an outer part and an elongate fish-bone core buried within the outer part including a plurality of U-shaped loops each having a pair of arms and a base extending transversely between and interconnecting the arms, the loops being longitudinally spaced apart from one another within the outer part and each adjacent pair of loops being connected to one another by a single connecting part extending transversely between the bases of the adjacent pair of loops, said method comprising:

(1) relatively transversely bending longitudinally adjacent portions of the weather strip in a first direction through a first angle and flexing two adjacent loops at said longitudinally adjacent portions such that the pairs of arms of said two adjacent loops swingably move toward one another about the corresponding connecting part;

(2) relatively transversely bending said longitudinally adjacent portions in a second direction opposite the first direction through a second angle and flexing the two adjacent loops such that the pairs of arms of said two adjacent loops swingably move away from one another about the corresponding connecting part; and (3) alternately repeating steps (1) and (2) to effect fracturing of the connecting part between said two adjacent loops at said longitudinally adjacent portions such that the two adjacent loops are structurally separate from one another to permit longitudinal stretching and contracting of the weather strip during installation.

2. The method of claim 1 further including performing said step (1) at a plurality of longitudinally adjacent portions of the weather strip at predetermined spaced-apart longitudinal intervals, performing said step (2) at the plurality of longitudinally adjacent portions, and performing said step (3) at the plurality of longitudinally adjacent portions.

3. The method of claim 2 wherein said steps (1) and (2) each comprise bending said plurality of longitudinally adjacent portions of the weather strip into a zig-zag shape.

4. The method of claim 2 wherein said plurality of longitudinally adjacent portions subjected to said bending of steps (1) and (2) are sufficiently spaced-apart from one another such that at least one of the connecting parts disposed within the longitudinal interval between two pairs of said longitudinally adjacent portions is unfractured.

5. A method of preparing an elongate length of weather strip prior to installation about the edge of an opening in a body, the weather strip having an outer part and an elongate core buried within the outer part, said method comprising:

(1) relatively transversely bending longitudinally adjacent portions of the weather strip in a first direction through a first angle;

(2) relatively transversely bending said longitudinally adjacent portions in a second direction opposite said first direction through a second angle; and (3) alternately repeating steps (1) and (2) to effect fracturing and separation of the entire core between said longitudinally adjacent portions to permit longitudinal stretching and contracting of the weather strip during installation.

6. The method of claim 5 wherein said step (1) comprises relatively transversely bending a plurality of longitudinally adjacent portions of the weather strip at predetermined spaced-apart longitudinal intervals in a first direction through a first angle, said step (2) comprises relatively transversely bending said plurality of longitudinally adjacent portions in a second direction opposite said first direction through a second angle, and said step (3) comprises alternately repeating steps (1) and (2) to effect fracturing and separation of the entire core between said plurality of longitudinally adjacent portions.

* * * * *